(Model.)

S. S. WARD.
KNIFE.

No. 258,173.                    Patented May 16, 1882.

WITNESSES:
Dom Twitchell
C. Sedgwick

INVENTOR:
S. S. Ward
BY Munn & Co
ATTORNEYS.

N. PETERS. Photo-Lithographer, Washington, D. C.

UNITED STATES PATENT OFFICE.

STEPHEN S. WARD, OF GREENFIELD, MASSACHUSETTS.

KNIFE.

SPECIFICATION forming part of Letters Patent No. 258,173, dated May 16, 1882.

Application filed March 16, 1882. (Model.)

*To all whom it may concern:*

Be it known that I, STEPHEN SELBY WARD, of Greenfield, in the county of Franklin and State of Massachusetts, have invented a new and useful Improvement in Cutlery, of which the following is a full, clear, and exact description.

My invention relates to the attachment of handles to knives and forks, with the object to secure greater strength and durability; and it consists in a tang divided into three portions, or two outer tangs to receive the handle between them, and a middle tang that enters the handle in the manner of a drive-tang, all as hereinafter described and claimed.

Reference is to be had to the accompanying drawings, forming a part of this specification, in which similar letters of reference indicate corresponding parts in all the figures.

Figure 1:
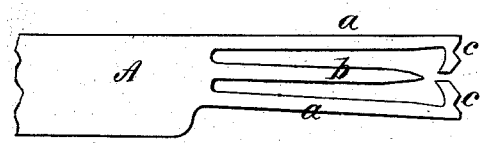
Figure 2:
Figure 3:
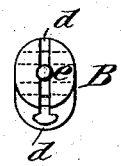
Figure 4:
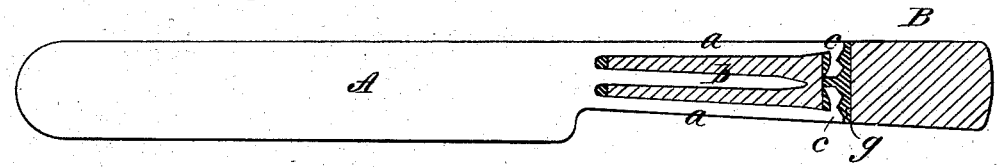
Figure 5:
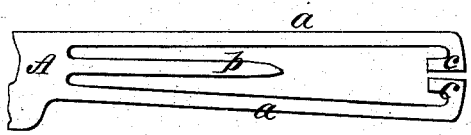

Figure 1 is a side view of a knife-blade formed with the improved tang. Fig. 2 is an edge view, and Fig. 3 an end view, of the handle as prepared to receive the tang. Fig. 4 is a sectional side view of the handle and blade connected. The other figures show the construction when the tang extends to the end of the handle.

A is the blade, formed with two outside tangs, $a\,a$, and a middle tang, $b$. The tangs $a$ are formed at their ends with hook-shaped lugs $c$, that turn inward and backward. The middle tang, $b$, is slightly shorter, and comes to a point at its end.

Figure 6:
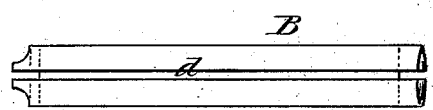
Figure 7:
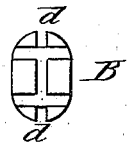
Figure 8:
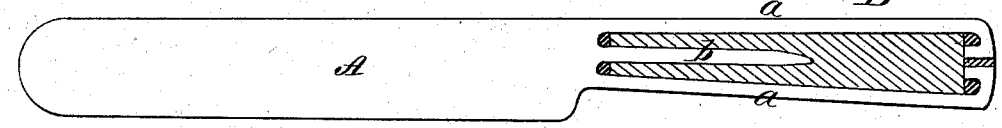

B is the handle, formed on its edges with grooves $d$, of suitable length, breadth, and depth for receiving the outer tangs, $a$, and formed also with a central hole, $e$, for the middle tang, $b$. When the outer tangs, $a$, extend the full length of the handle the outer end of the handle has a groove, as shown in Fig. 6, to receive the hook ends $c$. With the half-tangs shown in Figs. 1 and 4 the handle has a cross-aperture, $f$, connecting the two grooves $d$, that is to be filled, as shown at $g$, by metal cast into the hole to bind the hooks firmly. This is preferable with handles of hard wood, but is not necessary in soft wood, as the hooks may then be forced in, and the wood expanding upon the hooks will retain them. The full-length tangs are to be secured in the groove at the end of the handle by metal cast in the groove in the same manner. Bolsters and caps may be applied in the usual manner.

It will be seen that the middle tang, $b$, serves as a drive-tang, and the spaces between this middle tang and the outer ones receive wood upon which the outer tangs are bound. The middle tang braces the outside tangs, and relieves them from all strain, while they in turn bind the handle and retain it, so that when once put on the handle cannot become loose. I thus obtain the advantages of drive-tangs, with increased strength and no liability of the handle coming off. With the short or half tangs there is a saving in steel, with increased strength and a better appearance.

The invention is applicable to knives, forks, and other instruments of like character.

Having thus described my invention, I claim as new and desire to secure by Letters Patent—

1. The combination of the middle tang, $b$, with the two outer tangs, $a$, of the blade, substantially as shown and described.

2. A knife or similar instrument provided with triple tangs, in combination with a handle and cast-metal filling, said handle having a central hole and edge grooves, as shown and described.

3. In a three-tang instrument, the two outer tangs, $a$, formed with hook-lugs $c$ at their outer ends, substantially as described.

STEPHEN SELBY WARD.

Witnesses:
EMILY S. ELLIOT,
LYSANDER BARNES.